United States Patent [19]
Sargent

[11] 4,253,679
[45] Mar. 3, 1981

[54] TRAILER HITCH CARRIAGE

[76] Inventor: Frank T. Sargent, 1845 Landsdowne, Ann Arbor, Mich. 48105

[21] Appl. No.: 70,676

[22] Filed: Aug. 29, 1979

[51] Int. Cl.$^3$ .............................................. B60D 7/00
[52] U.S. Cl. ............................. 280/405 R; 280/476 R
[58] Field of Search .......... 280/476 R, 476 A, 405 A, 280/405 R, 423 A, 490 R

[56] References Cited
U.S. PATENT DOCUMENTS

| | | | |
|---|---|---|---|
| 2,309,204 | 1/1943 | Nelson | 280/476 R |
| 2,381,190 | 8/1945 | Tiner | 280/476 R |
| 2,460,466 | 2/1949 | Nogle | 280/476 R |
| 3,116,939 | 1/1964 | Ward | 280/476 R |
| 3,837,677 | 9/1974 | Haskins | 280/476 R |
| 4,033,601 | 7/1977 | Lindahl | 280/490 R |

Primary Examiner—John A. Pekar
Attorney, Agent, or Firm—Olsen and Stephenson

[57] ABSTRACT

A trailer hitch carriage connected to a towing vehicle and coupled to a trailer to reduce the downward trailer load carried by the towing vehicle. The trailer hitch carriage includes a frame mounted on wheels with the trailer being coupled to the frame at a predetermined location forwardly of the wheels so that the hitch carriage carries a portion of the trailer load. The trailer hitch carriage, in addition to reducing the downward trailer load carried by the towing vehicle, stabilizes the trailer against side forces generated by air turbulence formed by passing vehicles or crosswinds.

13 Claims, 8 Drawing Figures

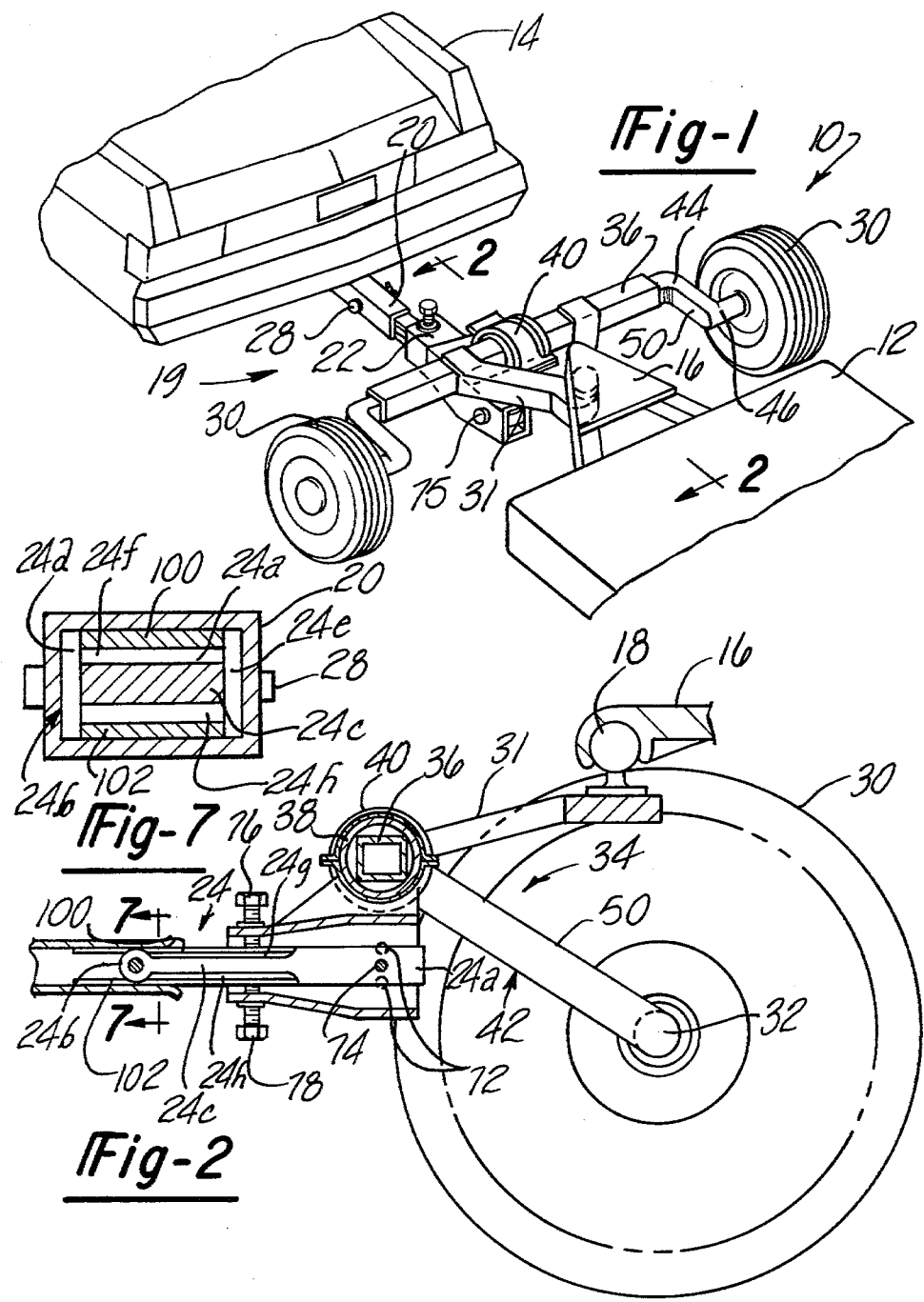

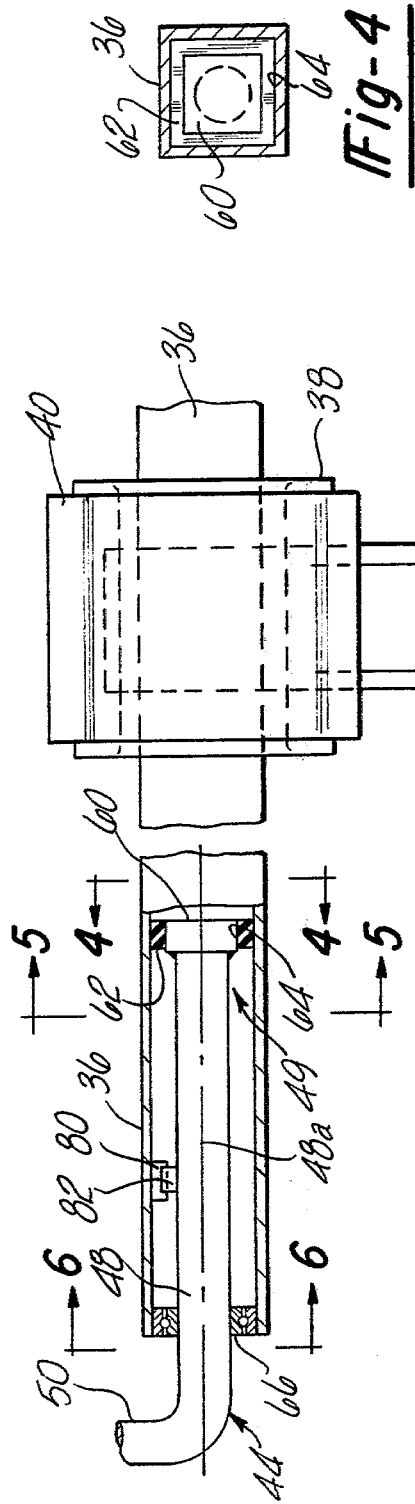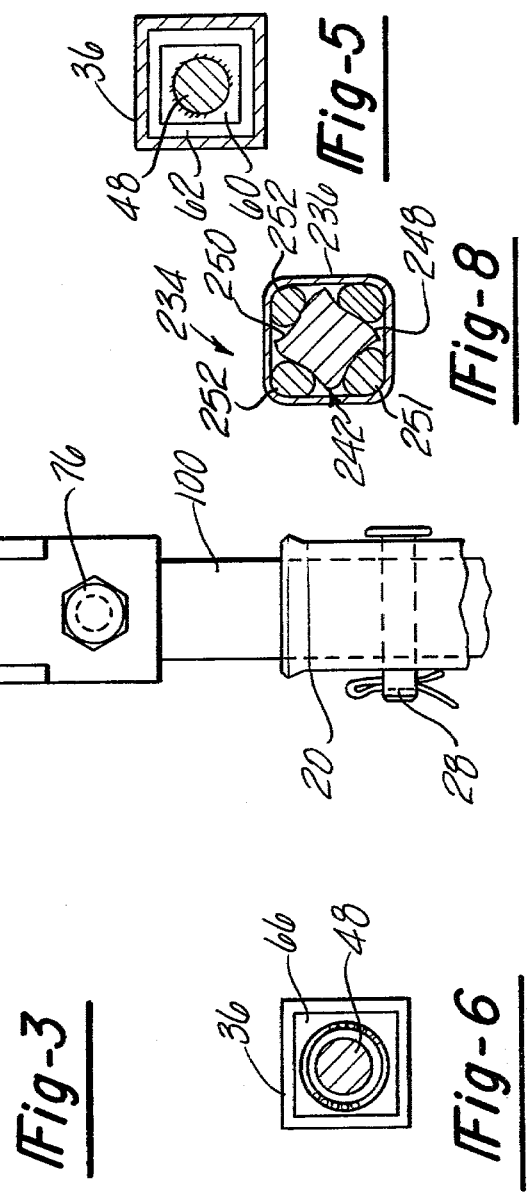

TRAILER HITCH CARRIAGE

BACKGROUND OF THE INVENTION

The present invention provides a hitch carriage to which a trailer is coupled. The hitch carriage is connected to a towing vehicle and functions to reduce the load carried by the towing vehicle and to stabilize the trailer as it is towed.

Recognition of the world's rapidly dwindling energy supplies, especially fossil fuels, has motivated the automobile industry to design and manufacture fuel efficient automobiles. In order to increase fuel efficiency, automotive designers have reduced the weight of the automobile and lowered the horsepower of its engine. Such light vehicles have light duty suspensions not suitable for towing most trailers, especially recreational or house trailers. Although the suspension systems on modern cars cannot adequately support the tongue weight of most modern recreational trailers, with proper gearing and modification of the drive train, these lighter vehicles have the necessary towing power to pull such trailers over the road. A need has arisen, therefore, for an auxiliary carriage capable of bearing a majority of the downward trailer load.

Even if the towing vehicle itself is quite capable of handling the trailer, air turbulence created by large vehicles as they pass the trailer and by crosswinds can cause the trailer to sway. The swaying motion of the trailer is transmitted to the towing vehicle forcing the driver to continually fight the wheel in order to compensate for trailer sway. Accordingly, an auxiliary carriage connected between the trailer and the towing vehicle can attenuate the swaying motion transferred to the towing vehicle, thereby easing the driver's efforts in steering the towing vehicle.

It is the general object of this invention, therefore, to provide a trailer hitch carriage for connecting a trailer to a towing vehicle.

It is another object of the present invention to provide a trailer hitch carriage having a suspension system providing resilient resistance to dynamic downward trailer loads of varying magnitudes resulting from the unevenness of the road over which the trailer is towed.

It is another object of the present invention to provide a trailer hitch carriage adapted to carry most of the downward trailer load.

It is another object of the present invention to provide a trailer hitch carriage capable of accommodating trailers having a variety of tongue heights.

It is another object of this invention to provide a trailer hitch carriage having a suspension system operable to connect dynamic downward trailer hitch movements into rotary movements which are resiliently resisted by means in the hitch carriage.

SUMMARY OF THE INVENTION

In accordance with the present invention, a trailer hitch carriage or dolly is provided for interconnecting a trailer to a towing vehicle such as an automobile or light truck. The trailer trailer hitch carriage serves to greatly reduce the downward trailer load carried by the towing vehicle, thereby obviating any modification to the towing vehicle's suspension. The trailer hitch carriage comprises a frame having a pair of side-by-side wheels mounted to the frame by a suspension system. The suspension system includes torsional springs or torsional rubber components connecting the wheels to the frame to provide variable rotary resistance against the effective downwardly directed trailer load which varies as the trailer is pulled over uneven road surfaces. The resistance to the rotary movements enables the use of small tires which will not interfere with the trailer tongue as the trailer is pulled through a turn.

The tongue of the trailer is connected to the trailer hitch carriage at a predetermined location forwardly of the axis of the wheels. Coupling the trailer to the trailer hitch carriage at this forward location distributes the downward trailer load between the trailer hitch carriage and the towing vehicle with the greater portion of the trailer load being carried by the trailer hitch carriage. The towing vehicle carries the remaining portion of the downward trailer load, minimal load that is necessary to maintain adequate towing stability.

The trailer hitch carriage also includes an adjusting mechanism capable of establishing a predetermined height of the trailer ball carried by the trailer hitch carriage relative to the road which under a load. This adjusting mechanism also provides for limited up and down free movement of the hitch carriage system without affecting the minimal load on the tow vehicle. The adjusting mechanism enables a variety of trailers having varying tongue weights and varying clearances between their tongues and the road to be simply and quickly coupled to the trailer hitch carriage of this invention at the proper tongue height and to tow vehicles with couplers of various heights.

The wheels of the trailer hitch carriage are spaced apart a distance that is essentially equal to the distance between the wheels of the towing vehicle so that the trailer hitch carriage tracks in essentially the same path through which the towing vehicle travels. The trailer hitch carriage, because it carries the greater portion of the trailer load, inhibits the transmittal of any swaying motion of the trailer to the towing vehicle. Such swaying motion usually results from air turbulence generated when a larger vehicle passes the towing vehicle and trailer or by crosswinds. The swaying motion is reduced by virtue of the frictional resistance between the carriage wheels and the road.

Further objects, features and advantages of the present invention will become apparent from a consideration of the following description when taken in connection with the appended claims and the accompanying drawing in which:

FIG. 1 is a perspective view of the trailer hitch carriage of the present invention illustrated interconnecting a trailer with a towing vehicle;

FIG. 2 is a sectional view of the trailer hitch carriage of this invention taken substantially from line 2—2 in FIG. 1;

FIG. 3 is a diagrammatic fragmentary plan view of the trailer htich carriage with portions broken away and other portions shown in section for purposes of clarity;

FIG. 4 is a sectional view of a portion of the trailer hitch carriage taken substantially from line 4—4 in FIG. 3;

FIG. 5 is a sectional view of a portion of the trailer hitch carriage taken substantially from line 5—5 in FIG. 3;

FIG. 6 is a sectional view of a portion of the trailer hitch carriage taken substantially from line 6—6 in FIG. 3;

FIG. 7 is a sectional view of the tongue of the trailer hitch carriage of this invention taken substantially from line 7—7 in FIG. 2; and FIG. 8 is a sectional view, like FIG. 5, showing a modified torsional spring unit.

Referring to the drawing, the trailer hitch carriage or dolly of this invention, indicated generally at 10, is shown in FIG. 1 connecting a trailer 12 to a towing vehicle such as an automobile 14. The trailer 12 has a tongue 16 which is coupled to a ball 18 carried by the trailer hitch carriage 10. The towing vehicle 14 is equipped with a hitch assembly 19 having a hollow receiver 20. The trailer hitch carriage 10 serves to carry the greater portion of the tongue weight thereby reducing the load carried by the automobile 14.

The trailer hitch carriage 10 includes a main frame 22 having a mounting bar 24 which is inserted into the hitch receiver 20. Cross holes 26 are formed through the mounting bar 24 and the receiver 20 and are positioned in alignment to receive a pin 28 which secures the trailer hitch carriage 10 to the automobile 14.

As seen in FIGS. 2 and 7, the mounting bar or tongue 24 is an elongated member having a first portion 24a disposed in and connected to the frame 22a, spool portion 24b through which the cross hole 26 is formed, and a connecting portion 26c formed integral with and extending between the first portion 24a and the spool portion 24b. The spool portion 24a has circular end sections 24d and 24e which extend substantially between the upper and lower walls of the receiver 20 and between which a cylindrical main section 24f extends. The cross sectional diameter of the main section 24f is less than the diameter of the end sections 24d and 24e to establish clearances between the main portion 24f and the inner upper and lower walls of the receiver 20.

The vertical dimension of the connecting portion 24c which extends radially from the center of the spool portion 24b is less than the diameter of the spool's main section 24f and is less than the vertical height of the first portion 24a. This construction provides upper and lower recesses or relief areas 24g and 24h which extend rearwardly from the spool portion 24b within the receiver 20 to the first portion 24a which is disposed entirely within the frame 22.

Upper and lower leaf spring members 100 and 102 are disposed respectively in the upper and lower recesses 24g and 24h and extend through the gaps between the spool's main portion 24f and the inner upper and lower walls of the receiver to positions forwardly of the spool portion 24b. The leaf springs 100 and 102 also extend rearwardly to abut against curved walls which extend from the upper and lower surfaces of the first portion 24a to upper and lower surfaces of the connecting portion 24c. The leaf springs 100 and 102 are urged against the tongue 24 by the screws 76 and 78.

When the tongue 24 is connected to the receiver 20 by extending the pin 28 through the aligned holes 26 in the receiver 20 and the spool portion 24b, the hitch carriage 10 is pivoted about a horizontal axis defined by the pin 28. The pivotal movement, however, is dampened by the leaf springs 100 and 102 which lie adjacent the inner upper and lower walls of the receiver 20. Accordingly, slight up and down movements of the carriage 10 can occur relative to the tow vehicle 14 as the mounting bar 24 pivots about the pin 28 with the movement being dampened by the leaf springs 100 and 102. As a result, slight up and down movements of the carriage 10 relative to the tow vehicle 14 will not add to the downward load carried by the receiver 20.

A pair of laterally spaced wheels 30 having coincidental axes of rotation 32 are mounted on the frame 22 by a suspension system 34 which includes a cross axle 36 extending transversely of the frame 22 in substantial parallel relationship with the axes 32 of the wheels 30. The cross axle 36 is secured to a circular bearing sleeve 38 which is rotatably disposed in a sleeve jacket 40 integrally formed with the frame 22. Accordingly, the cross axle 36 and the bearing sleeve 38 rotate coincidentially within the sleeve jacket 40 about an axis that is substantially parallel to the wheel axis 32. The frictional resistance between the sleeve 38 and the jacket 40 can be varied to control the relative movement between the cross axle 36 and the frame 22 as the carriage 10 is towed over a road. If excessive rotation of the cross axle 36 within the jacket 40 is observed, the frictional resistance, through the use of a brake-type liner (not shown) may be increased to lessen the relative movement between the axle 36 and the frame 22. This frictional resistance is particularly important in dampening the rotary motions between the cross axle 36 and the jacket 40 which are generated by the upward movement of the trailer tongue 16 following its downward movement.

A yoke 31 is mounted on the cross axle 36 straddling the jacket 40. The yoke 31, which extends rearwardly from the cross axle 36, carries ball 18 at a predetermined location forwardly of the axes 32 of the wheels 30. This forward position of the ball 18 is preselected and distributes the tongue weight between the towing vehicle 14 and the carriage 10 to achieve an optimum weight distribution. It has been found that approximately 8 to 15 percent of the total trailer weight should be supported by the trailer tongue and the remaining weight should be supported by the trailer wheels. It has been found that approximately 8 to 10 percent of the tongue weight which can be referred to as the minimal load should be applied to the receiver 20 to ensure towing stability between the vehicle 14 and the trailer 12. Thus, by means of this invention only 8 to 15 percent of the total trailer weight is transmitted to the tow vehicle. (A higher or lower percentage distribution may be used but with less efficient results.)

The suspension system 34 includes torsional spring units 42 connecting the wheels 30 to the cross axle 36. Such torsional springs may be formed of steel and rubber. Since both torsional spring units 42 are identical, only one will be described in detail. Each torsional spring unit 42 comprises a Z-shaped torsional spring member 44, as seen in FIG. 3, having an axle portion 46 on which the wheel 30 is rotatably mounted, a mounting portion 48 that extends parallel with the axle portion 46 and a connecting portion 50 which is perpendicular to the portions 44 and 46. The torsional member 44 is connected to the cross axle 36 in a position in which the depending portion 50 extends downwardly and rearwardly from the cross axle so that the axle portion 46 is positioned behind and below the mounting portion 48.

The mounting portion 48 extends into the hollow cross axle 36. The end 49 of the mounting portion 48 is secured such as by welding to a rectangular block member 60 which in turn is positioned in a rectangular opening 64 in a rubber mount 62 that is secured to the cross axle 36. The rubber mount 62 and the block 60 cooperate to restrain twisting of the mounting portion 48. A bearing assembly 66 encircles the mounting portion 48 and is located at the end of the cross axle 36 to provide radial bearing support for the mounting portion 48. When a load is applied to the wheel 30, the depending portion 50 applies a twisting force to the mounting portion 48 about its axis 48a which is parallel with the wheel axis 32. Application of a load to the depending portion 50 creates twisting resistance in the mounting portion 48 caused by its connection to the cross axle 36 at its end 49.

The torsional resistance to the rotary movements generated by the up and down movement of the hitch carriage to a great extend relieves the stress applied to the wheels 32. As a result smaller tires may be used which can pass beneath the tongue of the trailer when the trailer is towed through a turn.

A height adjusting mechanism is provided on the carriage 10 allowing the height of the ball 18 above the road to be varied to accommodate trailers having tongues 16 with varying ground clearances. The height adjusting mechanism includes a plurality of vertically aligned holes 72 formed in the frame housing 22. A hole 74 is formed through the mounting bar 24. A pair of vertically opposed set screws 76 and 78 are threadably mounted on the frame 22 at a position forwardly of the holes 72. Adjustment of the set screws 76 and 78 against the leaf springs 100 and 102 sets the height of the frame 22 relative to the mounting member 24 and positions the connecting portion 24c at the vertical midpoint or slightly above the vertical midpoint of the opening of receiver 20 when the initial load is applied on the ball 18. A pin 75 extends through the aligned holes 72 and 74 at the selected height of the frame 22 to secure frame 22 at a predetermined height relative to the receiver 20.

The suspension system 34 of the present invention provides for varying the rotational resilient resistance to the dynamic downward trailer load of varying magnitudes which result when the trailer 16 is towed over an uneven road. In other words, an increased load is met by an increased resistance. A downwardly directed force on the ball 18 creates a moment that initially rotates the cross axle 36 and its attached bearing sleeve 38 clockwise, as seen in FIG. 2, as the ball 18 is lowered. This clockwise movement is transferred to the wheel 30 through the torsional member 44. The initial downward load at the coupling causes the wheel axis 32 to cam rearwardly on the road and upwardly with respect to the cross axle 36. Thereafter, the torsional resistance in the torsion bar 44 tends to cam the wheel axis 32 forwardly, thereby elevating the ball mount 18 and trailer tongue 16 to their pre-established heights. This camming action of the wheels 30 moving forwardly with respect to the tow vehicle 14 shortens the distance momentarily between the rear wheels of the tow vehicle 14 and the carriage wheels 30 which lifts the cross axle 36 to the proper height, thus minimizing upward and downward movements of the trailer tongue 16. The rearward camming action of the wheels 30 is slight and smaller than the forward camming action when the tongue 16 is raised to its proper height. However, the coupling assembly, as previously described, enables the mounting bar 24 to pivot about the pin 28 through several degrees to prevent the chattering action of the up and down movement of the carriage 10 from being transferred to the tow vehicle 14.

The torsion bar members 44 may be preloaded to accommodate trailers with higher tongue weights. The torsion members 44 are twisted in a clockwise direction, as seen in FIG. 2, to lower the ball 18. Stop members 80 and 82 are secured to the mounting portion 48 and to the axle 36 to prevent the reverse movement of the torsion members 44 from its preloaded position. Trailer tongues with heavier tongue weights can more easily be coupled to the ball 18 which is in a lower position relative to the ground.

The distance between the wheels 30 is substantially equal to the distance between the rear wheels of the automobile 14 so that the wheels 30 track through generally the same paths traveled by the wheels of the automobile 14. This width between the carriage wheels 30 allows the wheels 30 to move in the open spaces between the towing vehicle 14 and the trailer 16 when the vehicle 14 and the trailer 16 travel through a curve or a turn.

In operation, assume that the trailer 12 is coupled to the trailer hitch carriage 10, which is hitched to the automobile 14. The mounting of the trailer tongue 16 on the trailer ball 18 causes the axle 36 to rotate clockwise, as seen in FIG. 2 within the bearing jacket 38. The torsion member 44 generates a resilient resistance against the tongue weight which is transferred from the wheel 30 to the ball mount 16. When the automobile 14 and the trailer 12 are stationary, an equilibrium condition will be established in which the greater portion of the tongue weight 16 is carried by the trailer hitch carriage 10 with the remaining portion of the tongue weight (8 to 10% of the total trailer weight) being carried by the automobile 14.

Assume now that the trailer is being towed over a road having an uneven surface. At times, the dynamic forces will increase the effective tongue weight applied to the carriage 10. The increased downwardly directed load will initially lower the ball 18 causing cross axle 36 to rotate in the sleeve jacket 38 moving the wheel axis 32 rearwardly with respect to the cross axle 36 as the torsional member 44 is twisted. The torsional resistance in the torsion member 44 will generate opposing forces drawing the wheel forwardly, thereby returning the ball 18 to its pre-established height. The slight motions up and down of the hitch carriage 10 are free to occur by the rotation of the bar 24 about the axis of the pin 28, without adding to the minimal load on the tow vehicle if applied through the coupling.

Also, the suspension system 34 provides increased resistance to increases in the effective tongue weight. As noted above, if the cross axle 36 rotates too freely over bumpy roads, a brake liner may be used to increase the frictional resistance between the sleeve 38 and the jacket 40 to dampen relative rotation between the cross axle 36 with its attached yoke 31 and the frame 22.

The trailer hitch carriage 10 also reduces trailer sway that can be transmitted to the automobile 14. Trailer sway is normally caused by air turbulence generated when large vehicles such as semi-trucks pass the trailer 12, or naturally by crosswinds. The frictional engagement of the wheels 30 with the road and their non-articulated mounting on the carriage prevent the swaying action of the trailer 12 from being transmitted to the automobile 14. Thus, the operator of the automobile 14 is not presented with difficult handling situations. Because the tires do not pivot about a vertical axis, there may be some tire scrub between the tires and the road. However, the small tire size and the infrequent number of sharp turns through which the carriage 10 tracks will minimize unnecessary tire wear.

A modified suspension system 234 is shown in FIG. 8 which is a view similar to the view shown in FIG. 5.

The suspension system 234 includes torsional spring units 242 (one shown) having a generally rectangular mounting portion 248 disposed in a hollow rectangular cross axle or tube 236 to extend substantially the entire length thereof. The mounting portion 248 has curved sides 250; specifically, the curved sides have an involute shape.

The mounting portion 248 is positioned in the tube 236 so that its sides 250 face the corners 251 of the tube 236. Four rubber cords 252 are positioned in the tube 236 at its corners 251. The cords 252 extend parallel with the mounting portion 248 are sandwiched between the involute sides 250 and the corners 251 of the tube 236.

The up and down movement of the wheels of the hitch carriage is transferred to the mounting portion 248 whose rotary or twisting movement is resiliently resisted as the rubber cords 252 are compressed between the involute sides 250 and the corners 251 of the tube 236. The involute configuration of the sides 250 ensures maximum contact between the sides 250 and the rubber cords to provide the resulting efficient torsional resistance.

The embodiment shown in FIG. 8 provides an alternative method of employing torsional resistance in the hitch carriage of this invention and can be readily substituted for the torsional spring units 42 described in connection with FIGS. 3-6. The basic torsional principle of the FIG. 8 embodiment can be found on torsion axles manufactured by Henschen Industrial Corporation, 522 North Main Street, Jackson Center, Ohio 45334.

From the above description, it can be seen that an improved trailer hitch carriage is provided which reduces the trailer load carried by the towing vehicle and which inhibits the swaying action of a trailer to be transmitted to the towing vehicle. The trailer hitch carriage suspension system converts the up and down movements of the carriage 10 into rotational movements and moments and absorbs and dampens these rotary movements by the torsional springs and by frictional resistance. Therefore, the movements are maximally absorbed in the hitch carriage 10 and minimally transferred to the tow vehicle and to the carriage wheels. Thus, the tow vehicle is largely relieved of the trailer's tongue weight, and the tires of the hitch carriage are not overstressed which allows small tires to be utilized. The trailer hitch carriage 10 of this invention is particularly suited for use with small lightweight vehicles having suspension systems not adapted for hauling trailers.

What is claimed:

1. A hitch carriage for connecting a trailer to a towing vehicle to reduce the downward trailer load carried by said towing vehicle, said hitch carriage comprising a frame, a trailer mounting member pivotally mounted on said frame for pivoting about an axis transverse of said towing vehicle, at least one road wheel having an axis of rotation transverse of said towing vehicle, wheel mounting means for pivotally mounting said road wheel on said frame for movement of said road wheel about an axis transverse of said towing vehicle forward of said road wheel axis, suspension means connecting said trailer mounting member to said wheel mounting means, means for releasably connecting said frame to said towing vehicle, and trailer hitch means for connecting said trailer to said trailer mounting member at a predetermined location relative to said road wheel axis and said means for releasably connecting said frame to said towing vehicle so that a predetermined portion of said trailer load is carried by said road wheel.

2. The hitch carriage according to claim 1, wherein said suspension means is operable to permit up and down movement of said trailer hitch means relative to said road wheel and includes resilient load resistance means operably connected to said trailer mounting member and to said wheel mounting means, said load resistance means being operable to provide resilient resistance against downward trailer loads of varying magnitude generated as a result of said trailer being towed over roads having irregular surfaces.

3. The hitch carriage according to claim 2, wherein said predetermined location where said trailer connects to said hitch carriage is located between said road wheel axis and the location at which said frame is connected to said towing vehicle so as to allocate the downward trailer load between said road wheel and said towing vehicle and is rearward of said trailer mounting member axis.

4. The hitch carriage according to claim 3, wherein said load resistance means includes torsion means connected between said wheel mounting means and said trailer mounting member, said torsion means having a torsional axis substantially parallel to said road wheel axis.

5. The hitch carriage according to claim 4, wherein said suspension means includes a cross member fixed to said trailer mounting member and pivotally mounted on said frame for rotation about an axis transverse to said towing vehicle, said torsion means interconnecting said wheel mounting means and said cross member so that the downward movement of the trailer mounting member causes rotation of said cross member in a direction urging said road wheel against the road and is resisted by said torsion means.

6. The hitch carriage according to claim 1, wherein said road wheel comprises a pair of wheels laterally spaced and having coincident axes of rotation, said towing vehicle having side by side wheels, the distance between said hitch carriage wheels being substantially equal to the distance between said towing vehicle wheels.

7. The hitch carriage according to claim 1, and further including height adjustment means selectively operable to establish a predetermined height of said location where said trailer is connected to said trailer hitch means relative to the road.

8. The hitch carriage according to claim 1, wherein said means for releasably connecting said frame to said towing vehicle includes a receiver member secured to said towing vehicle and a mounting member pivotally mounted on said receiver member about an axis transverse of said towing vehicle for up and down pivotal movement relative to said receiver member, said mounting member being connected to said frame to permit up and down movement of said carriage relative to said receiver member.

9. The hitch carriage according to claim 8, wherein said releasable connecting means further includes bias means for resisting the up and down movement of said hitch carriage relative to said receiver member.

10. The hitch carriage according to claim 1, wherein said road wheel cams rearwardly in response to a downward force on said trailer hitch means to lower said trailer hitch means as said force is absorbed and thereafter cams forwardly as a result of said suspension means to elevate said trailer hitch means to its original height.

11. The hitch carriage according to claim 1, wherein said trailer mounting member and said wheel mounting means have coincident axes for pivotal movement relative to said frame.

12. The hitch carriage according to claim 11, which further comprises means for applying frictional resistance between said frame and said trailer mounting member so as to restrain relative motion between said frame and said trailer mounting means by absorbing and dissipating energy as a friction-type shock absorber.

13. A hitch carriage for connecting a trailer to a towing vehicle to reduce the downward trailer load carried by said towing vehicle, said hitch carriage comprising a frame, means for releasably and pivotally connecting said frame to said towing vehicle for constrained up and down movement about an axis transverse of said towing vehicle, an elongated cross member extending transverse of said towing vehicle and pivotally and frictionally mounted on said frame about an axis transverse of said towing vehicle, a Y-shaped yoke mounted on said cross member at the double end thereof and extending rearward of said cross member such that the single end thereof pivots up and down in response to pivoting of said cross member, a pair of wheel mounting members pivotally mounted on the ends of said cross member about an axis coincident with said cross member axis and extending rearward and downward from said cross member axis, torsion means connecting said wheel mounting member and said cross member for applying increased resistance in response to pivoting of said cross member relative to said wheel mounting members, a pair of laterally spaced road wheels rotatably mounted on said wheel mounting members about an axis transverse of said towing vehicle, and trailer hitch means for connecting said trailer to said single end of said Y-shaped yoke at a predetermined location forward of said road wheels axis such that a predetermined portion of said trailer load is carried by said road wheels.

* * * * *